United States Patent
Benoliel et al.

[19]

[11] Patent Number: 6,047,928

[45] Date of Patent: Apr. 11, 2000

[54] FRICTION CLAMP RESTRAINT MECHANISM FOR SPRINGBACK REFLECTORS

[75] Inventors: Alexander M. Benoliel, Redondo Beach; Vincent E. Cascia, Manhattan Beach, both of Calif.

[73] Assignee: Hughes Electronics Corporation, El Segundo, Calif.

[21] Appl. No.: 09/081,911

[22] Filed: May 19, 1998

[51] Int. Cl.[7] .................................................. B64G 1/44
[52] U.S. Cl. ........................ 244/173; 343/882; 343/915; 343/DIG. 2
[58] Field of Search ................................ 244/173, 158 R; 343/915, 912, DIG. 2, 880, 882; 292/256, 256.69

[56] References Cited

U.S. PATENT DOCUMENTS

| | | |
|---|---|---|
| 4,419,033 | 12/1983 | Roth et al. ............................... 244/173 |
| 4,489,329 | 12/1984 | Vezain et al. ....................... 343/DIG. 2 |
| 4,646,102 | 2/1987 | Akaeda et al. ........................... 343/915 |
| 4,725,025 | 2/1988 | Binge et al. ............................. 244/173 |
| 4,926,181 | 5/1990 | Stumm ..................................... 343/915 |
| 5,393,018 | 2/1995 | Roth et al. ............................... 244/173 |
| 5,574,472 | 11/1996 | Robinson ................................. 343/915 |
| 5,644,322 | 7/1997 | Hayes et al. ............................. 343/915 |
| 5,911,536 | 6/1999 | Roth ........................................ 244/173 |

*Primary Examiner*—Peter M. Poon
*Assistant Examiner*—Judy Nelson
*Attorney, Agent, or Firm*—Georgann S. Grunebach; M. W. Sales

[57] ABSTRACT

A friction retaining device for holding and releasing reflector panels of a satellite. The retaining devices having a friction bushing mounted thereon to prevent the reflectors from becoming disengaged from the clamp. The retaining device has a pair of opposing arms having upper ends that communicate with bumpers on the reflectors and lower portions that communicate with a release mechanism. Upon actuation of a pyrotechnic device, the reflectors are deployed. At the same time, the release mechanism disengages the lower portions of the opposing arms allowing them to remove the bumpers from the reflectors.

19 Claims, 5 Drawing Sheets

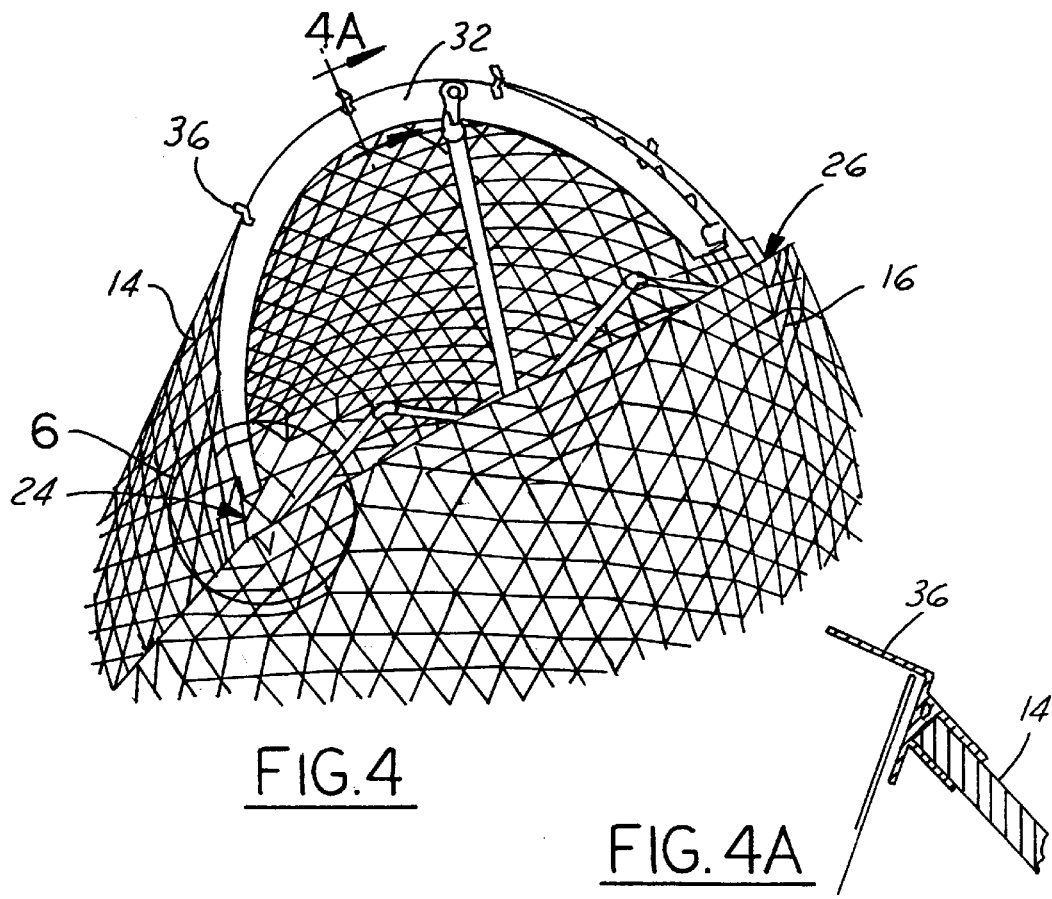
FIG. 4
FIG. 4A
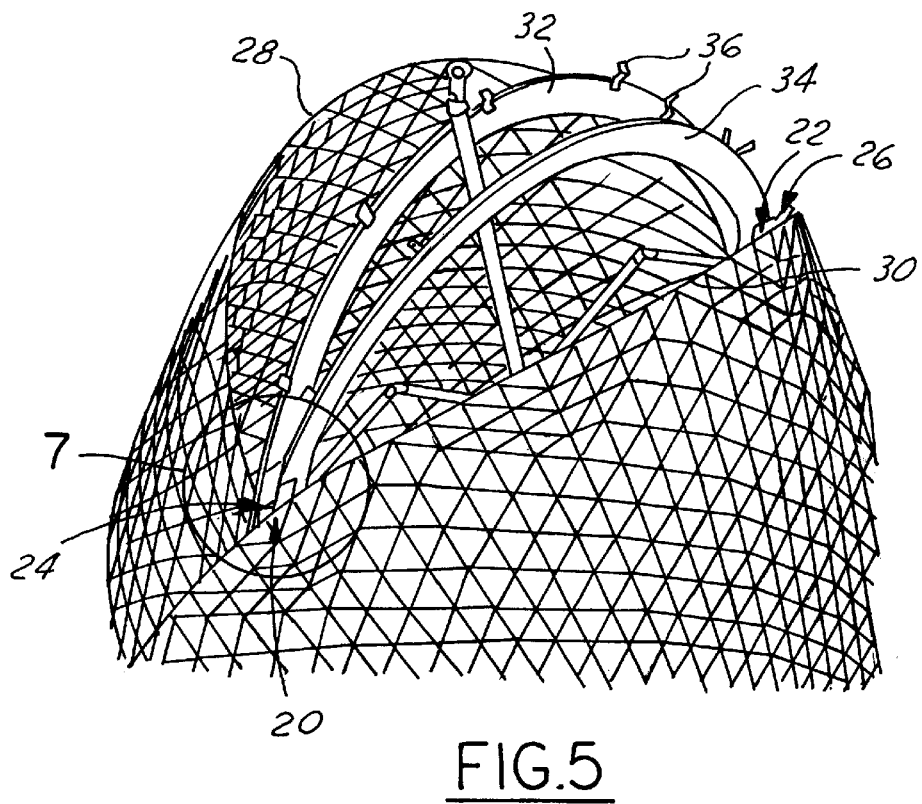
FIG. 5

FRICTION CLAMP RESTRAINT MECHANISM FOR SPRINGBACK REFLECTORS

CROSS-REFERENCE TO RELATED APPLICATIONS

This application is related to co-pending U.S. patent application Ser. No. 09/08/582, entitled "Independent LaunchLock Mechanism," filed simultaneously with the present application, the subject matter of such co-pending application being incorporated herein by reference.

GOVERNMENT STATEMENT

The subject matter of this application was developed under United States Contract No. NAS5-32900 with the National Aeronautics and Space Administration. The highest classification of the subject matter of this contract is Secret. The classification of the subject matter of this application has not been officially determined, but is believed to be unclassified.

TECHNICAL FIELD

The present invention relates to a restraint device for retaining and then simultaneously releasing two springback reflectors on a conventional satellite. More specifically, the present invention relates to a friction clamp for retaining and then simultaneously releasing two springback reflectors and a reflector support panel structure with a single pyrotechnic device.

BACKGROUND ART

Previous apparatus for retaining springback reflectors or panels in a stowed position required the use of separate retaining hardware for the reflectors and the support panel structure. In order for these prior apparatus to operate, some of the retaining hardware was secured to the springback reflectors rendering the prior designs inefficient and expensive.

These designs were inefficient because the retaining hardware added additional weight to the reflectors that could affect both its deployed frequency as well as the reflector's shape after its unfurling and deployment. Additionally, the initial relative motions between the reflectors and the retaining hardware created a risk that some of the retaining hardware would bind to the reflectors during the retraction phase, which would prevent the reflectors from unfurling properly.

More specifically, the retaining hardware of these prior designs included a bolt or a pin that restrained the springback reflectors and kept them in a stowed position and held the support panel mechanism in stowed position. In order to retain the reflectors, the bolt was passed through both the reflector surfaces. In order for the reflectors to separate, the bolt had to be retracted from engagement with the reflectors. After retraction, the bolt was retained in a catcher tube. The catcher tube was mounted on the outer surface of one of the reflectors which added additional weight and caused potential operational problems.

To remove the bolt or pin that passed through the reflectors and held the support panel mechanism in a stowed position, the bolt or pin needed to be retracted normal to the initial motion of the reflectors as they unfurled, creating risk during the deployment sequence. However, there currently are no commercially available pin pullers with a retraction length sufficient to allow the pin to be fully retracted from engagement with the reflector shells and the support panel deployment mechanism. Nested shear cones were also mounted to each reflector surface to accomplish shear transfer which also added additional weight. Thus, these prior designs are both impractical and costly.

As an alternative solution, multiple pyrotechnic devices could be utilized to actuate the support panel deployment. This would alleviate the need for a long pin puller. However, the inclusion of multiple pyrotechnic devices would add further cost and weight to the system.

SUMMARY OF THE INVENTION

It is thus a general object of the present invention to provide a retaining device for holding and releasing satellite springback reflectors that does not require retaining hardware that passes through the reflectors.

It is a related object of the present invention to provide a retaining device that allows free deployment of the springback reflectors along independent paths without the possibility of hang-ups or interference.

It is another object of the present invention to provide a retaining device that does not increase the weight of the springback reflectors.

It is still another object of the present invention to provide a retaining device that eliminates the need for multiple pyrotechnic devices to deploy the springback reflectors and the support panels.

In accordance with the objects of the present invention, a restraining device for holding a plurality of springback reflectors on a satellite is shown and disclosed. The restraining device is movable between a stowed position, where the reflectors are attached to the retaining device, and a deployed position, where the reflectors are unfurled. The restraining device includes a pair of opposing arms with each arm having a lower hooked shaped portion and an upper portion. The upper portions of each of the opposing arms are in communication with a separate bumper panel engageable with the upper periphery portions of each of the reflectors. The bumper panel helps protect the reflectors from unnecessary damage when transported in their stowed position. The bumper panel (support panel structure) must be deployed prior to the reflector unfurling (deployment).

The pair of opposing arms has at least one extension spring attached therebetween that biases the arms toward a deployed position. The lower hooked shaped portions of the pair of opposing arms are in communication with a piston device that maintains the restraining device in the stowed position with the pair of arms spaced apart against the biasing force of the spring. The piston is maintained in communication with the pair of opposing arms by a clamp, which is rotatable between a normally closed position and an open position. The clamp is secured in it normally closed position by a bolt. A bolt cutter is provided for shearing off the bolt and thus allowing the clamp to move away from its normally closed position to its open position. After the clamp has moved to its open position, the piston is no longer in contact with the clamp and is allowed to move away from engagement with the pair of arms, thus allowing the arms to move toward one another and move the restraining device towards its deployed position.

BRIEF DESCRIPTION OF THE DRAWINGS

FIG. 4 is a perspective view of the upper portion of the satellite illustrating the support panel structure in an undeployed position in accordance with the present invention;

FIG. 4(a) is a side view of an illustrative L-clip for a bumper panel in accordance with a preferred embodiment of the present invention;

FIG. 5 is a perspective view of the upper portion of the satellite illustrating the bumpers in a deployed position in accordance with the present invention;

BEST MODES FOR CARRYING OUT THE INVENTION

Figure 1:
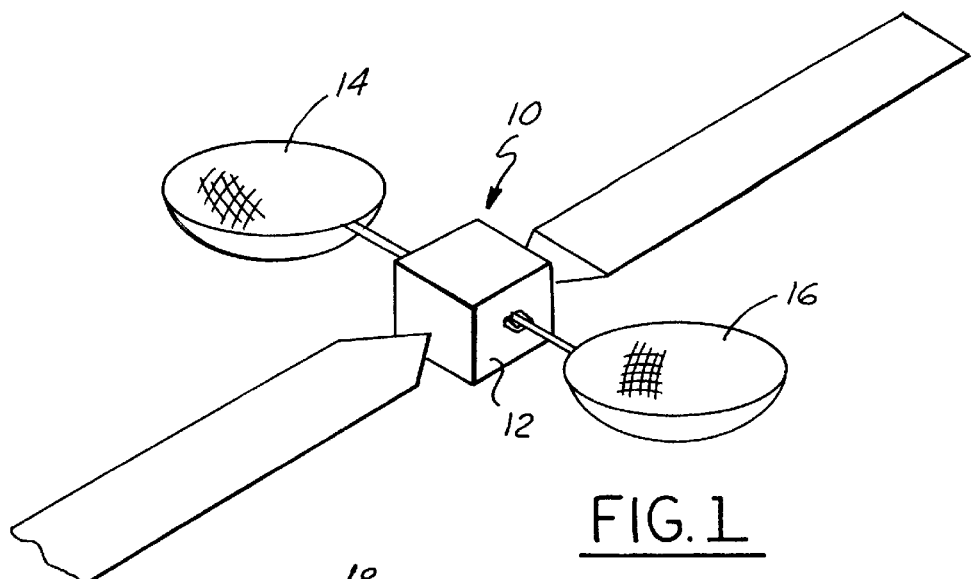
FIG. 1 is a perspective view of a fully deployed satellite in accordance with the present invention.

The present invention will be described in conjunction with a space satellite. A satellite 10 is illustrated in FIG. 1 in a fully deployed position. In its fully deployed position, the satellite 10 includes a housing 12 and a pair of reflectors or panels 14, 16 that are connected to and extend outwardly from the housing. The housing 12 includes all the electronic and other equipment that controls the operation and deployment of the satellite as well as facilitating communication to and from the satellite.

Figures 2, 3:
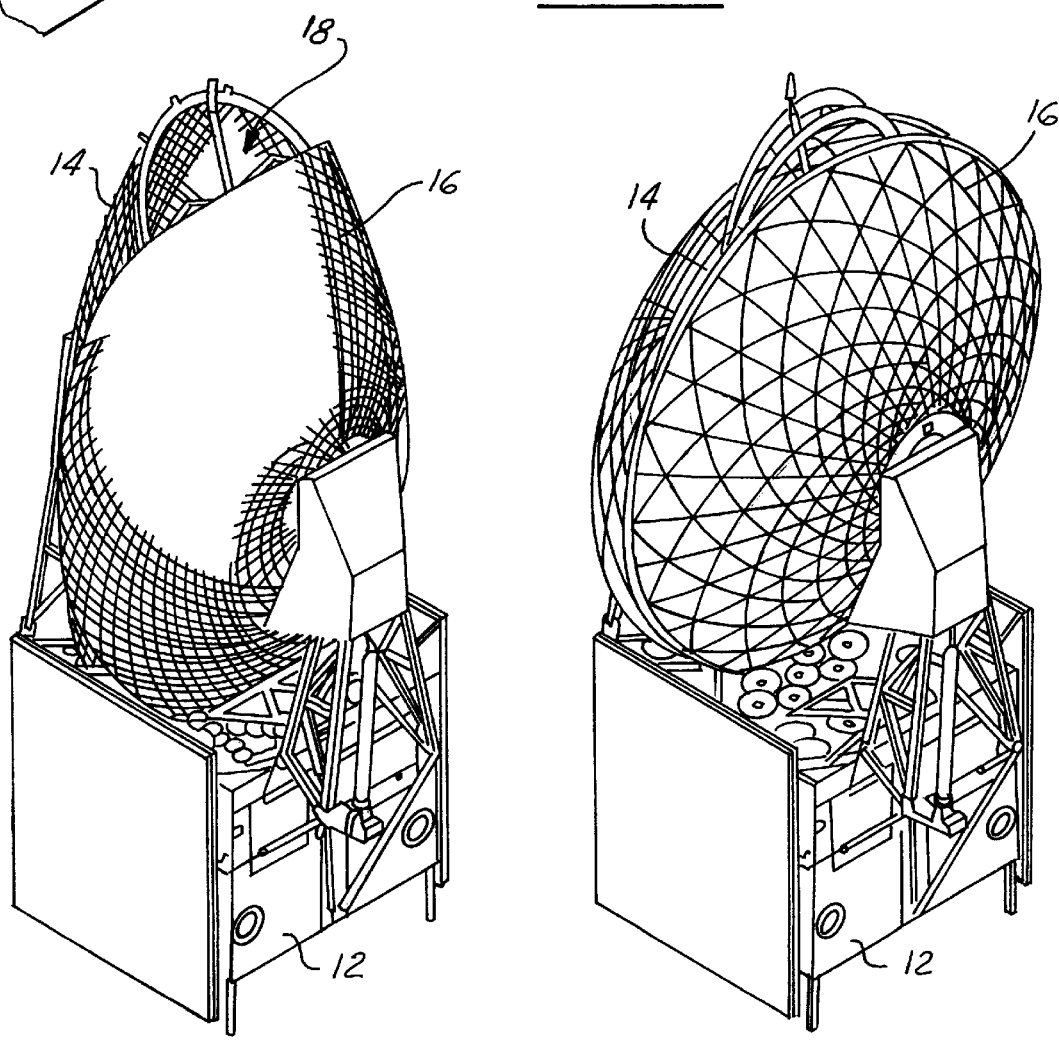
FIG. 2 is a perspective view of a satellite with the reflectors in a stored position in accordance with the present invention.
FIG. 3 is a perspective view of a satellite with the reflectors deployed or unfurled in accordance with the present invention.

In FIG. 2, the satellite 10 is shown in an undeployed position. In its undeployed position, the reflectors 14, 16 are also in a stored or undeployed position. In this position, the edges of the reflectors 14, 16 are curved and overlap each other. The reflectors 14, 16 are in this position during transport. When the reflectors 14, 16 are overlapped for storage, they form an open area 18 between the two reflectors 14, 16. FIG. 3 illustrates the satellite 10 in a stored position after the reflectors 14, 16 have been deployed or unfurled. After the reflectors 14, 16 have been deployed to this position, the satellite 10 then deploys the reflectors 14, 16 into the position shown in FIG. 1.

FIGS. 4 and 5 illustrate the mechanism for retaining the reflectors 14, 16 in their stored position and then releasing them allowing them to unfurl. The mechanism for retaining the reflectors 14, 16 includes a pair of restraining devices 20, 22 which are located at each of the junctions 24, 26 where the first reflector 14 overlaps the second reflector 16. When the reflectors 14, 16 are in their stored position, they each have an upper periphery portion 28, 30 that borders and defines the open area 18. A respective panel or bumper 32, 34 is positioned on each of the upper periphery portions 28, 30. The bumpers 32, 34 each have a plurality of clips 36 that attach the bumper 32, 34 to the respective reflector 14, 16. The clips are preferably L-clips and each have a pair of opposing surfaces that receive and support the reflectors 14, 16 therein. The clips provide dynamic stability and structural protection. The bumpers are constructed of a rigid material and help prevent the reflectors, which are constructed of a non-rigid material, from being damaged during transport or launch. The clips may be formed of any shape so long as they support the reflectors.

The first restraining device 20 is located at the first junction 24 between the first reflector 14 and the second reflector 16 and is positioned within the circle shown in FIG. 4. The second restraining device 22 is positioned generally opposite the first restraining device 20 and is located at the second junction 26 between the first reflector 14 and the second reflector 16. As is discussed in more detail below, the first restraining device 20 and the second restraining device 22 are each in communication with both the first bumper 32 and the second bumper 34. The first and second restraining devices 20, 22 operate to disengage the bumpers 32, 34 from the reflectors 14, 16, as is shown in FIG. 5.

Figure 6:
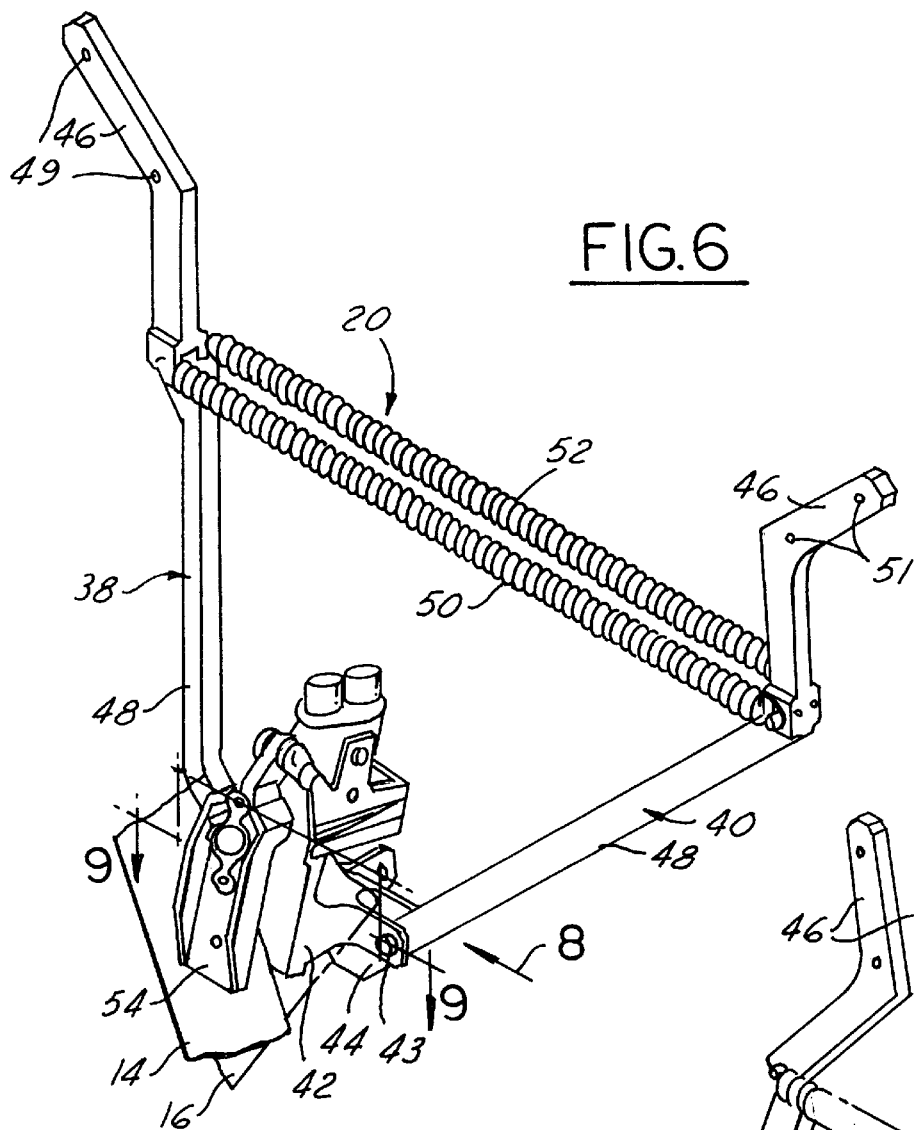
FIG. 6 is an blow up view of the circled portion of FIG. 4 and depicts a perspective view of the restraining device in a stowed position in accordance with a preferred embodiment of the present invention.

FIG. 6 illustrates the preferred restraining device in accordance with the present invention. The first restraining device 20 is illustrative of the second restraining device 22 and the structure of the description and operation of the first restraining device 20 is equally applicable to the structure and operation of the second restraining device 22.

The first restraining device 20 is shown in FIG. 6 in a stowed position. Both restraining devices are locked in this position when the reflectors 12, 14 are in their stowed position (FIG. 4). The first restraining device 20 has a pair of opposing arms 38, 40 that are pivotally connected to a body portion 42. The opposing arms 38, 40 are each bolted to the body portion 42 by a bolt 43 and the opposing arms 38, 40 pivot about the bolt 43. The opposing arms 38, 40 each have a hooked lower portion 44, an upper "L-shaped" portion 46, and a middle portion 48 extending therebetween that are connected to each of the opposing arms 38, 40. The opposing arms 38, 40 have a pair of extension springs 50, 52 extending therebetween. Two extension springs are preferably utilized, however, more or less springs may be included. Additionally, different types of springs may be substituted for extension springs, such as tension or torsional springs.

Figure 7:
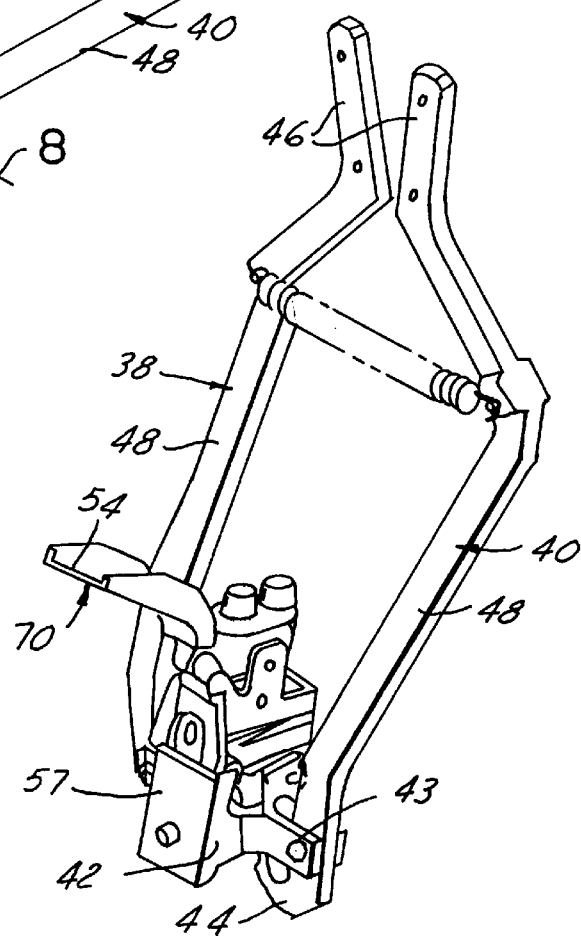
FIG. 7 is a blow up view of the circled portion of FIG. 5 and depicts a perspective view of the restraining device in a deployed position in accordance with a preferred embodiment of the present invention.

The preferred extension springs 50, 52 tend to bias the opposing arms 38, 40 from their stowed position, where the arms 38, 40 are spaced apart, to their deployed position, where the arms 38, 40 are close together, such as shown in FIG. 7. The upper "L-shaped" portions 46 are connected to both the first and second bumpers 32, 34 through holes 49, 51 formed in the upper "L-shaped" portions 46 where the bumpers 32, 34 are secured thereto. For example, the upper "L-shaped" portions 46 of the first opposing arms 38 of each of the restraining devices 20, 22 are preferably connected to the first bumper 32 via bolt holes 49. Similarly, the upper "L-shaped" portion 46 of the second opposing arms 40 of each of the restraining devices 20, 22 are connected to the second bumper 34 via bolt holes 51. As the arms 38, 40 are pulled together by the extension springs 50, 52 toward their deployed position, the first and second bumpers 32, 34 are disengaged from the respective reflectors 14, 16 by the movement of the arms 38, 40 as shown in FIG. 5.

The body portion 42 preferably includes a clamp portion 54 that secures the reflectors 14, 16 in the stored position by pinching a portion of the reflectors 14, 16 to the body portion 42. Each of the reflectors 14, 16, has a friction bushing 56 positioned thereon and the reflectors 14, 16 are preferably clamped to the body portion 42 such that the friction bushings 56 engage a clamping surface 57 of the body portion 42. The friction bushings 56 are bonded to the surfaces of each reflector 14, 16 and are preferably constructed of aluminum. The bushings 56 are friction coated to allow the application of a shear load without damage to the reflectors 14, 16. The friction bushings allow a much higher and predictable shear load to be transferred between the reflectors and the clamp as compared to no bushings. It should be understood that the friction bushings 56 may be constructed of any other suitable material and may be attached to the reflectors 14, 16 by any known method.

As will be discussed in more detail below, the clamp portion 54 is rotateable from a closed position, shown in FIG. 6, where the reflectors 14, 16 are in their stowed position. The clamp portion 54 is rotateable to an open position, shown in FIG. 7, where the reflectors 14, 16 are released from the clamp portion 54 and thus deployed. The clamp portion 54 is maintained in the closed position by a bolt 58, which when removed, allows the clamp portion 54 to rotate to an open position.

The body portion 42 has a pyrotechnic device 60 mounted thereon by a bracket 62. The pyrotechnic device 60, which is well known in the art, is actuated by a charge or other known means. Upon actuation of the pyrotechnic device 60, the bolt 58 is sheared off and the entire bolt 58 is forced into a catcher tube 64 mounted to the clamp portion 54. It should also be understood that a non-pyrotechnic device could be utilized to shear or release the bolt 58, including pneumatic or electromechanical devices. Additionally, the bolt 58 could be replaced with any other tension restraining device, such as a cable or other mechanical means.

Figure 8:
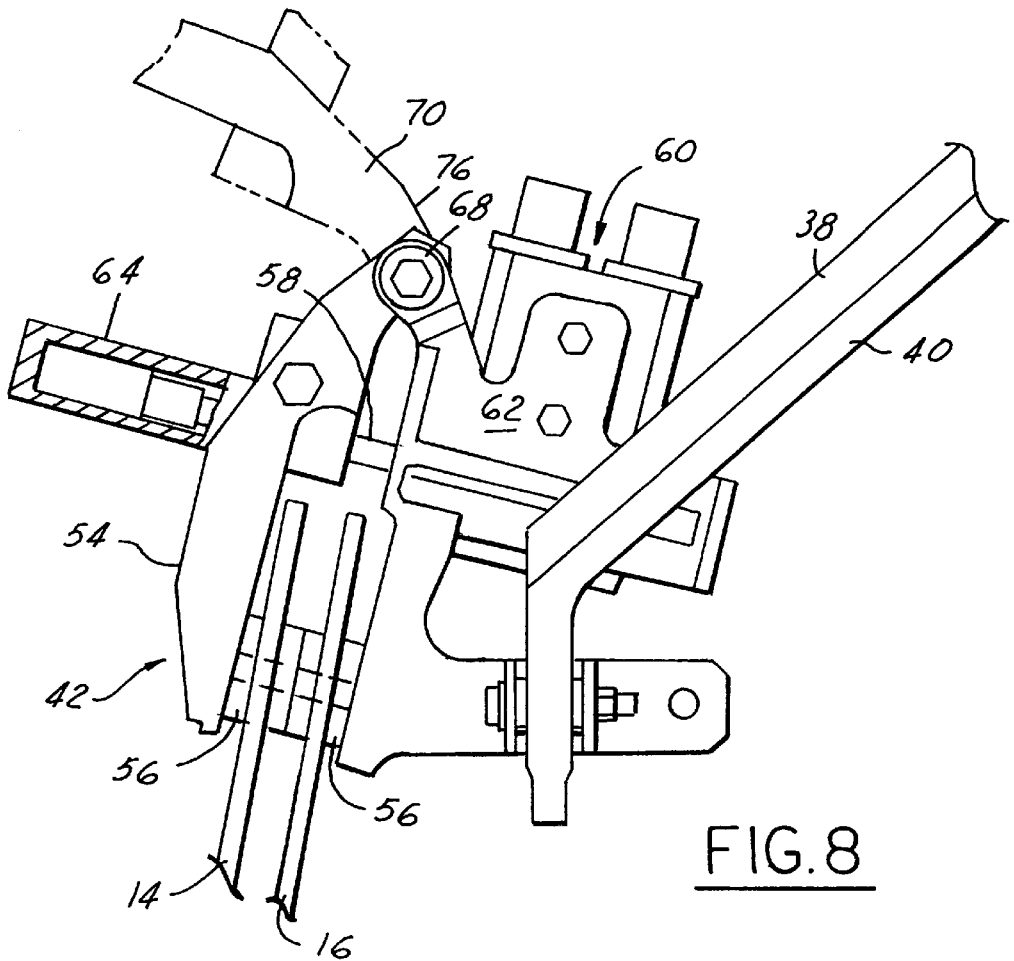
FIG. 8 is a side view broken away of the restraining device of FIG. 6 in the direction of the arrow labeled 8.

The catcher tube 64 is necessary to catch the bolt and prevent it from being discharged into space. The bolt 58 is discharged through a hole 66 formed through the clamp portion 54 and into the catcher tube 64. The clamp portion 54 is in communication with a pair of torsion springs 74 (FIG. 9) that cause the clamp portion 54 to rotate. Thus, when the bolt 58 is discharged through the clamp portion 54, the force from the torsion springs 74 causes the clamp portion 54 to rotate about a pin 68 to an open position 70, shown in FIGS. 7 and 8. A stop member 76 limits the travel of the clamp portion 54.

Figure 9:
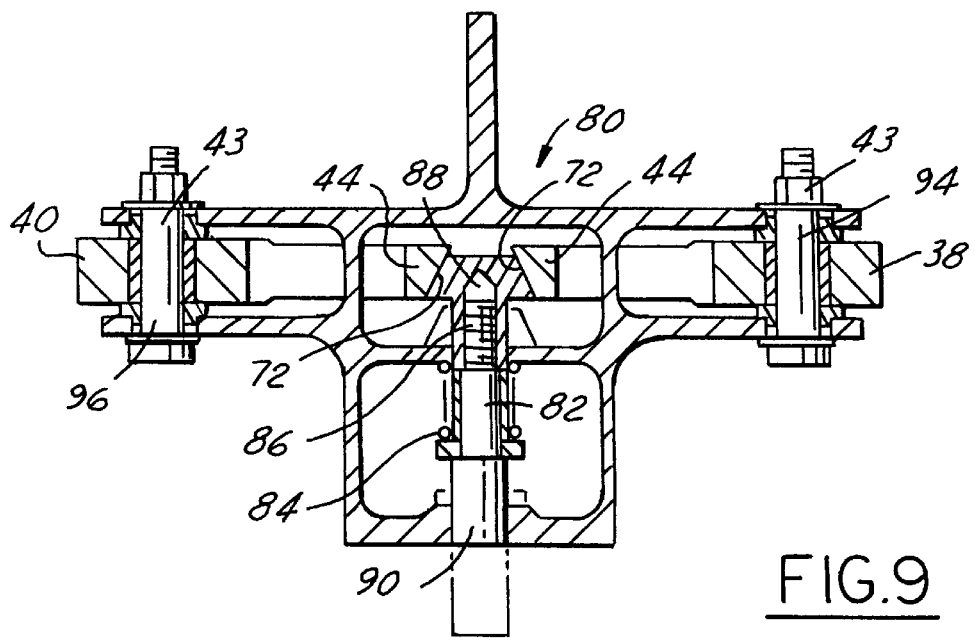
FIG. 9 is a cross-sectional view of the restraining of FIG. 6 in the direction of the lines 9—9.
Figure 10:
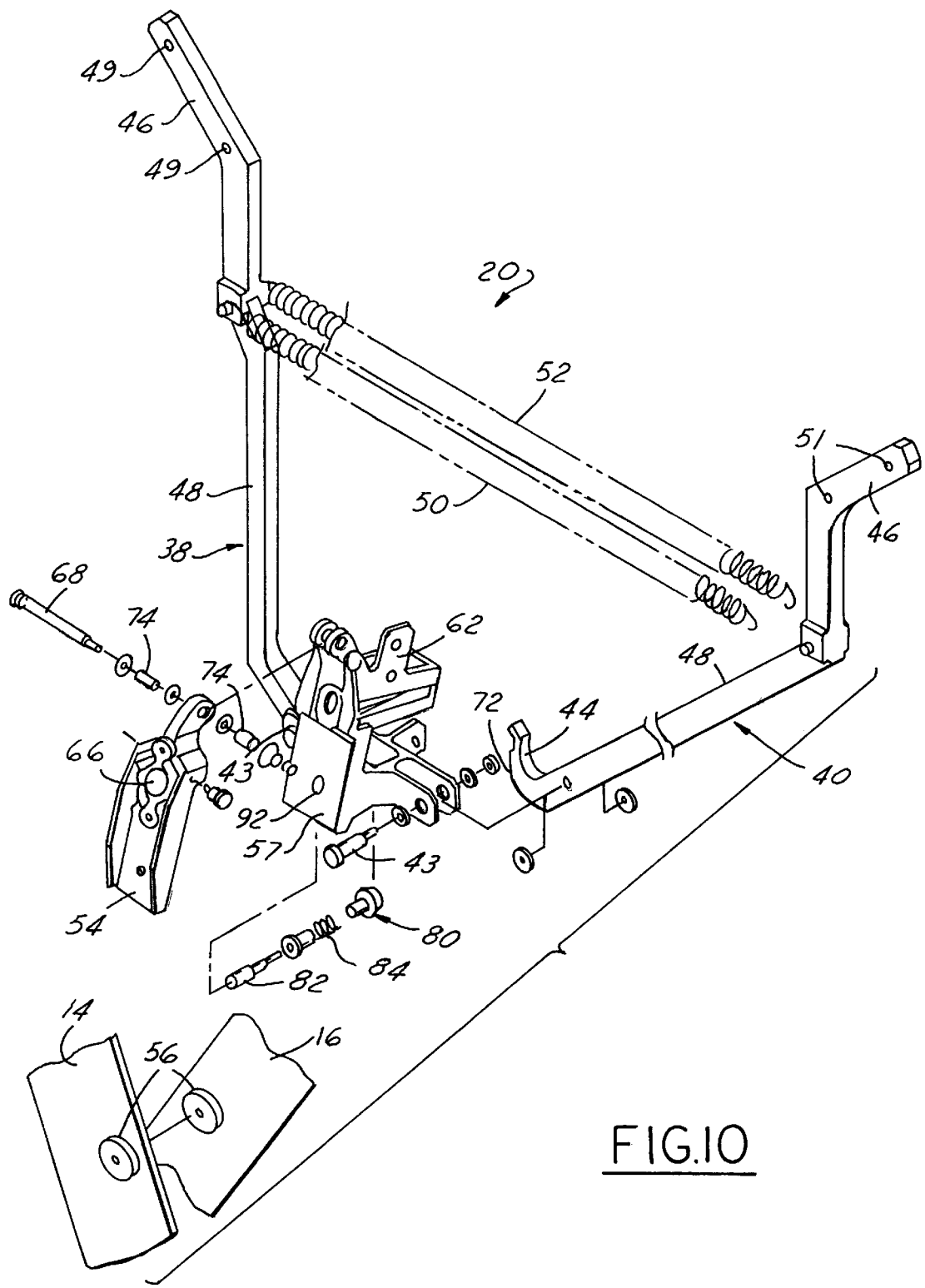
FIG. 10 is an exploded view of the retaining device in accordance with a preferred embodiment of the present invention.

FIG. 9 illustrates the preferred release mechanism 80 in accordance with the present invention. The preferred release mechanism 80 is in communication with the hooked lower portion 44 of each of the opposing arms 38, 40. The release mechanism 80 contacts the inner surface 72 of the hooked lower portion 44 of each of the opposing arms 38, 40 to prevent them from rotating. The release mechanism 80 operates against the force of the pair of extension springs 50, 52 to keep the retaining device 20 in its stowed position.

The release mechanism 80 preferably includes a piston 82 and a compression spring 84 surrounding the piston 82. The piston 82 has a first end 86 with a shear cone 88 formed thereon. The shear cone 88 communicates with the hooked lower portions 44 of the opposing arms 38, 40. The piston 82 also has a second end 90 that abuts against the clamp portion 54, through opening 92 formed through the clamping surface 57. When the first restraining device 20 is in its stowed position, the clamp portion 54 contacts the second end 90 of the piston 82 and maintains it between the hooked-lower portions 44 of the opposing arms 38, 40 and in contact with the inner surfaces 72 of each hooked lower portion 44. The first end 86 of the piston locks the hooked lower portions 44 and prevents them from rotating about pivot points 94, 96.

When the pyrotechnic device 60 shears off the bolt 58 and allows the clamp portion 54 to rotate to its open position 70, the second end 90 of the piston 82 is no longer in contact with the clamp portion 54. The piston 80 can thus move away from contact with the inner surfaces 72 of the hooked lower portions 44 by the influence of the compression spring 84. The second end 90 of the piston 80 can thus move through the opening 92 freeing the opposing arms 38, 40 to move toward one another due to the force of the extension springs 50, 52. Thus, at the same time the clamp portion 54 releases the reflectors 14, 16 for deploying, the opposing arms 38, 40 move the bumpers 32, 34 away from the reflectors so that the reflectors 14, 16 may be fully deployed. In operation, when the pyrotechnic device 60 cuts the bolt 58, that action allows the clamp portion 54 to move to its open position 70. When the clamp portion 54 is moved to its open position 70, the reflectors 14, 16 are released simultaneously with the disengagement of the bumpers 32, 34 from the reflectors 14, 16.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed is:

1. A restraining device for holding a pair of springback reflectors on a satellite, the restraining device being movable between a stowed position and a deployed position, comprising:

a pair of opposing arms with each arm having a lower hooked shaped portion and an upper portion;

said upper portion of each of said pair of opposing arms being in communication with a separate bumper panel;

at least one extension spring attached to each of said pair of opposing arms and extending therebetween;

a piston device in communication with said lower hooked shaped portions of said pair of opposing arms to maintain the restraining device in said stowed position with said pair of arms spaced apart;

a clamp being movable between a normally closed position, in communication with said piston biasing it into contact with said pair of opposing arms, and an open position not in communication with said piston;

a bolt for maintaining said clamp in said normally closed position;

a pyrotechnic device for shearing off said bolt and allowing said clamp to move to said open position;

whereby said piston is allowed to move away from engagement with said pair of opposing arms, allowing said arms to move toward said deployed position thus deploying said springback reflectors.

2. The restraining device of claim 1 further including a spring in communication with said piston to bias said piston away from engagement with said opposing arms.

3. The restraining device of claim 2, wherein said pyrotechnic device is a bolt cutter that when actuated shears off the bolt and moves said clamp away from said normally closed position to said open position.

4. The restraining device of claim 3, further comprising a catcher tube for receiving and housing the portion of said bolt that is sheared off by said bolt cutter.

5. The restraining device of claim 4, wherein each of said reflectors has one of said separate bumper panels positioned across its upper periphery to support said reflectors when said restraining device is in said stowed position.

6. The restraining device of claim 5, wherein when said restraining device moves from its stowed position to said deployed position, thus deploying said reflectors, said bumpers are simultaneously disengaged from said reflectors.

7. A satellite system, including a pair of reflectors having bumpers positioned on their upper periphery, comprising:
   a pair of restraining devices each holding both of said reflectors and moveable between a stowed position and a deployed position;
   said restraining devices each comprising:
      a clamp mechanism for releaseably securing said reflectors;
      a pyrotechnic device for releasing said clamp mechanism and thus said reflectors;
      a release mechanism in communication with said clamp for maintaining said bumpers positioned on said reflectors;
      a pair of arms in communication said release mechanism; and
      at least one spring extending between said pair of arms;
   whereby when said pyrotechnic device is actuated, said clamp mechanism moves out of communication with said release mechanism allowing said reflectors to be deployed while simultaneously removing said bumpers from said reflectors.

8. The satellite system of claim 7, where in said release mechanism includes a piston assembly and a biasing spring which biases said piston away from said pair of arms.

9. The satellite system of claim 8, wherein said pair of arms include an upper portion that is in communication with one of said bumpers and a lower portion which is in communication with said release mechanism.

10. The satellite system of claim 9, wherein said clamp forces said piston, over the force of the biasing spring, into communication with the lower portion of each of said arms, maintaining them in their stowed position and preventing them from deploying.

11. The satellite system of claim 10, further comprising a bolt for keeping said clamp in engagement with said piston to maintain said restraining devices in said stowed positions.

12. The satellite system of claim 11, wherein said pyrotechnic device shears off said bolt upon its actuation, releasing said clamp, allowing said spring to bias said piston out of engagement with said lower portion of each of said arm.

13. The satellite system of claim 12, wherein a pair of extension springs extend between each of said pair of arms, with each spring having opposing ends for attachment to each of said arms.

14. The satellite system of claim 13, wherein said pair of extension springs act to pull said pair of arms together to move said retaining mechanism toward said deployed position when said piston is disengaged from said lower portions of each of said arms.

15. The satellite system of claim 14, wherein said pyrotechnic device of each of said restraining devices is actuated simultaneously so that each of said bumpers is removed from its respective reflector and each of said reflectors is deployed simultaneously.

16. The satellite system of claim 15, further comprising a pair of friction bushings located on said reflectors to prevent said reflectors from prematurely becoming disengaged from said clamps.

17. The satellite system of claim 12, further comprising a catching tube mounted on said clamp for receiving said sheared off portion of said bolt.

18. A method of retaining and releasing a pair of reflector panels of a satellite, comprising:
   providing a pair of retaining devices, each retaining device having a pair of arms, with a lower portion and an upper portion and mechanically connected by a spring;
   clamping a portion of each of said pair of reflector panels in one of said retaining devices;
   clamping a portion of each of said pair of reflector panels in the other of said retaining devices such that said retaining devices are generally opposing each other;
   releasably connecting said upper portion of each of said arms with a bumper positioned on each of said reflectors; and
   releasably engaging said lower portion of each of said arms to prevent rotation thereof.

19. The method of claim 18, further comprising:
   actuating a pyrotechnic device associated with said retaining devices whereby, said retaining devices become unclamped and deploy, said lower portion of said arms are releasably disengaged and rotate so that said upper portion of said arms remove said bumpers from said reflectors.

* * * * *